United States Patent
Chao et al.

(10) Patent No.: US 11,847,611 B2
(45) Date of Patent: Dec. 19, 2023

(54) ORCHESTRATING AND AUTOMATING PRODUCT DEPLOYMENT FLOW AND LIFECYCLE MANAGEMENT

(71) Applicant: Dell Products, L.P., Round Rock, TX (US)

(72) Inventors: Cy Chao, Austin, TX (US); Anil Varkhedi, San Jose, CA (US); Helen He, Cary, NC (US); Richard Ang, Medina, WA (US)

(73) Assignee: DELL PRODUCTS, L.P., Round Rock, TX (US)

( * ) Notice: Subject to any disclaimer, the term of this patent is extended or adjusted under 35 U.S.C. 154(b) by 200 days.

(21) Appl. No.: 17/384,554

(22) Filed: Jul. 23, 2021

(65) Prior Publication Data
US 2023/0023945 A1  Jan. 26, 2023

(51) Int. Cl.
*G06Q 10/087* (2023.01)
*G06F 9/455* (2018.01)

(52) U.S. Cl.
CPC ....... *G06Q 10/087* (2013.01); *G06F 9/45558* (2013.01)

(58) Field of Classification Search
CPC .................. G06Q 10/087; G06F 9/45558
See application file for complete search history.

(56) References Cited

U.S. PATENT DOCUMENTS

| | | | |
|---|---|---|---|
| 10,318,265 B1 * | 6/2019 | To | H04L 67/34 |
| 10,318,320 B1 * | 6/2019 | Thomas | G06F 9/45558 |
| 11,477,165 B1 * | 10/2022 | McDowall | H04W 12/088 |
| 2016/0266921 A1 * | 9/2016 | Mao | G06F 9/45558 |
| 2018/0046482 A1 * | 2/2018 | Karve | G06F 9/45558 |
| 2018/0145884 A1 * | 5/2018 | Stefanov | H04L 67/10 |
| 2018/0316572 A1 * | 11/2018 | Kamalakantha | H04L 67/562 |
| 2018/0321967 A1 * | 11/2018 | Barker | H04L 41/0806 |
| 2020/0110638 A1 * | 4/2020 | Asthana | H04L 67/51 |
| 2020/0192689 A1 * | 6/2020 | Smith, IV | G06F 16/178 |
| 2020/0394048 A1 * | 12/2020 | Chen | G06F 9/4406 |
| 2021/0200814 A1 * | 7/2021 | Tal | G06F 16/90335 |
| 2021/0311760 A1 * | 10/2021 | Oki | G06F 9/5077 |
| 2021/0328873 A1 * | 10/2021 | Yeung | H04L 41/40 |
| 2022/0327006 A1 * | 10/2022 | Makhija | G06N 20/00 |
| 2022/0365771 A1 * | 11/2022 | Shelke | G06F 11/0793 |
| 2022/0385532 A1 * | 12/2022 | Erez | H04L 41/0816 |
| 2023/0024067 A1 * | 1/2023 | Li | G06F 9/45558 |
| 2023/0027902 A1 | 1/2023 | Chao et al. | |

* cited by examiner

*Primary Examiner* — Michael Jared Walker
(74) *Attorney, Agent, or Firm* — Amin, Turocy & Watson, LLP

(57) ABSTRACT

A system can receive a first indication to provision and configure an asset. The system can send a second indication to a first component that manages provisioning of the asset to provision the asset, the first component operating in a first namespace. The system can, based on the first component determining that the asset depends on a computing service, receiving a third indication from the first component that is directed to a second component that manages provisioning of the computing service, the second component operating in a second namespace that is separate from the first namespace. The system can send a fourth indication to the second component to provision the computing service for the asset.

20 Claims, 11 Drawing Sheets

400

402

```
SERVICES
└ [0] 404
    ├ name: <name> 406
    ├ id: <id> 408
    ├ description: <description> 410
    ├ tags: 412
    │   ├ [0]
    │   │   └ name: <name 2> 414-0
    │   ├ [1]
    │   │   └ category: <category> 414-1
    │   └ [2]
    │       └ version: <version> 414-2
    ├ pan_updateable: <bool> 416
    ├ plans 418
    ├ requirements 420
    └ dependenies 422
```

IN RESPONSE TO RECEIVING A FIRST INDICATION TO CONFIGURE AN ASSET, SEND A SECOND INDICATION TO A FIRST COMPONENT THAT MANAGES PROVISIONING OF THE ASSET TO PROVISION THE ASSET ON AT LEAST ONE COMPUTING DEVICE, THE FIRST COMPONENT OPERATING IN A FIRST NAMESPACE 804

↓

BASED ON THE FIRST COMPONENT DETERMINING THAT THE ASSET DEPENDS ON A SERVICE BASED ON INFORMATION STORED BY THE FIRST COMPONENT IN THE FIRST NAMESPACE, RECEIVE A THIRD INDICATION FROM THE FIRST COMPONENT THAT IS DIRECTED TO A SECOND COMPONENT THAT MANAGES PROVISIONING OF THE SERVICE, THE SECOND COMPONENT OPERATING IN A SECOND NAMESPACE 806

↓

SEND A FOURTH INDICATION TO THE SECOND COMPONENT TO PROVISION THE SERVICE FOR THE ASSET ON THE AT LEAST ONE COMPUTING DEVICE 808

ORCHESTRATING AND AUTOMATING PRODUCT DEPLOYMENT FLOW AND LIFECYCLE MANAGEMENT

BACKGROUND

In computing, orchestration can generally comprise configuring and managing computer hardware and software. A container can generally comprise a software environment in which an application and its dependencies can be run, separate from other containers, and utilizing a host operating system (compared with a guest operating system within the software environment, as with a virtual machine).

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive a first indication to provision and configure an asset. The system can send a second indication to a first component that manages provisioning of the asset to provision the asset, the first component operating in a first namespace. The system can, based on the first component determining that the asset depends on a computing service, receiving a third indication from the first component that is directed to a second component that manages provisioning of the computing service, the second component operating in a second namespace that is separate from the first namespace. The system can send a fourth indication to the second component to provision the computing service for the asset.

An example method can comprise, in response to receiving a first indication to configure an asset, sending, by a system comprising a processor, a second indication to a first component that manages provisioning of the asset to provision the asset on at least one computing device, the first component operating in a first namespace. The method can further comprise, based on the first component determining that the asset depends on a computing service, receiving, by the system, a third indication from the first component that is directed to a second component that manages provisioning of the computing service, the second component operating in a second namespace. The method can further comprise sending, by the system, a fourth indication to the second component to provision the computing service for the asset on the at least one computing device.

An example non-transitory computer-readable medium can comprise instructions that, in response to execution, cause a system comprising a processor to perform operations. These operations can comprise, in response to receiving a first indication to configure an asset, sending a second indication to a first component that manages provisioning of the asset to provision the asset on at least one computing device, the first component operating in a first namespace. The operations can further comprise, based on the first component determining that the asset depends on a service based on information stored by the first component in the first namespace, receiving a third indication from the first component that is directed to a second component that manages provisioning of the service, the second component operating in a second namespace. The operations can further comprise sending a fourth indication to the second component to provision the service for the asset on the at least one computing device.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates an example system architecture for a service description document that can facilitate orchestrating and automating product deployment flow and lifecycle management, in accordance with an embodiment of this disclosure;

FIG. 8 illustrates another example process flow for orchestrating and automating product deployment flow and lifecycle management, in accordance with an embodiment of this disclosure;

DETAILED DESCRIPTION

Overview

Figure 1:
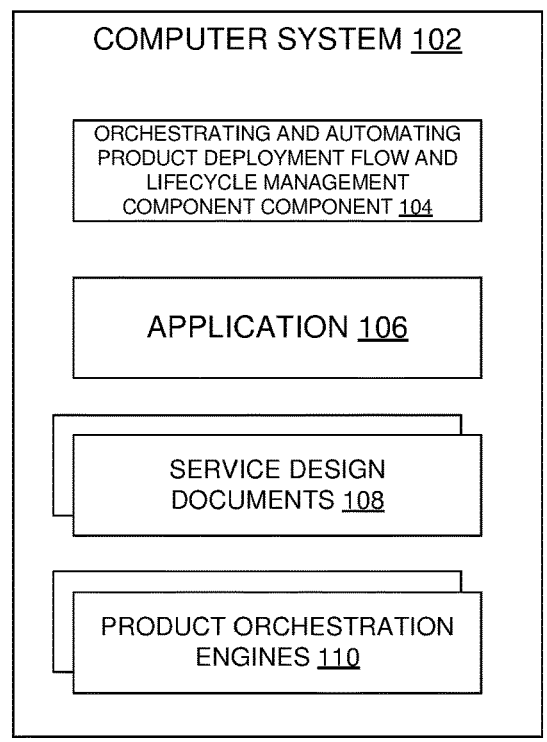
FIG. 1 illustrates an example system architecture that can facilitate orchestrating and automating product deployment flow and lifecycle management, in accordance with an embodiment of this disclosure.

There Modern information technology (IT) infrastructure has become increasingly complex. In some examples, the level of complexity is increasing at an accelerated rate. A modern solution can involve multiple products and both hardware and software, and multiple systems across multiple clouds, both public and private. Deploying a modern solution can be difficult, time consuming, and go wrong at any of many integration points.

The present techniques can be implemented to mitigate against problems with orchestrating modern solutions by simplifying how much work a user does in orchestrating the solution. In some examples, a system can determine the resources that a solution needs (from hardware to software), to verify if a user requires additional resources, and to orchestrate solution deployments automatically.

In an example, a user wants to set up an application on a computer system on the user's premises that is configured for hybrid cloud usage. The computer system can lack sufficient resources—such as networking, compute, and storage resources—that are required by associated application user licenses. In this example, an orchestration flow can involve adding or activating additional resources, provisioning the added resources, expanding an configuring a private cloud infrastructure, and then deploying and configuring the application.

A system's orchestration service can create a product orchestration engine architecture. The system can define an extensible application programming interface (API; such as an Orchestration Service Interface (OSI) API). The API can comprise an Orchestration Service Broker (OSB) representational state transfer (REST) API, which can be an extension of an Open Service Broker (OSB) API, and a Common Orchestrator Service (COS) REST API.

The system can create a product orchestration base image that contains provision and configuration management tooling, and an OSB REST service. A product can integrate provisioning and life cycle management automation scripts with a base image to build a product orchestration engine to automate provisioning and life cycle management of the product. The system can be flexible in how product orchestration engines are designed and built. A product orchestration engine can be built to handle a specific product, a family of products, or a type of products.

In an example, deploying an application can comprise five steps. In a first step, a network product orchestration engine is dispatched to configure network switches, setup static Internet Protocol (IP) addresses and Dynamic Host Configuration Protocol (DHCP) IP addresses, and virtual local area networks (VLANs). In a second and third step, a compute orchestration engine and a storage orchestration engine can configure compute nodes, storage nodes, and storage volumes. In a fourth step, a cloud orchestration engine can install a hypervisor to compute nodes, set up one or more virtual machine management servers, and set up workload clusters.

In a fifth step, an application orchestration engine can install and configure the application. In some examples, the user who requests that the application be installed only sees this fifth step, and not the other steps.

This example can illustrate that it can be a daunting task for users to figure out what is required to install an application, as well as an end-to-end flow to set up each piece of the solution. Prior techniques can automate some parts, but leave gaps for the user to fill, which creates user confusion.

An orchestration flow automation mechanism according to the present techniques can automate complex product orchestration flows, such as the one in the above example, from the moment a user selects a product to a point of having the product fully configured and operational in the user's data centers, and then throughout an entire lifecycle of the product.

One aspect of the present techniques can involve defining a product orchestration service description document for a product orchestration engine that can define a service provided, resource requirements per customer plan and license selection, and a dependency to other product orchestration engine services.

In some examples, each product orchestration engine can create a product orchestration engine service description document. This service description document can specify one or more services. Each service can have a unique name and identifier. A service can define one or more tags to support service discovery and search queries so that a service can be found by other product orchestration engine service.

A service can define a requirements section that specifies the resource that the service needs per unit quantity. This information can permit a system to determine whether a user has enough resources to meet the requirements. A service can implement a COS technique to determine resource requirements based on the requirements data, and a user's selected plan and quantities.

A service can also define a dependencies section that specifies required services that are provided by other product orchestration engine services. An orchestration service can use the identified dependencies to evaluate and determine whether a user has the required resources for the selected product.

In some examples, an orchestration service can implement the following API calls.

API calls for a function manifest that lists functions, resource requirements, and dependencies:
GET/v2/catalog—get the catalog of services that the service broker offers or get the catalog of a product orchestrator engine API calls for service instances:
POST/v2/service_instances/{instance_id}—provision a service instance
PUT*/v2/service_instances/{instance_id}—upgrade a service instance
PATCH/v2/service_instances/{instance_id}—update a service instance
DELETE/v2/service_instances/{instance_id}—deprovision a service instance
GET/v2/service_instances/{instance_id}—get a service instance (and attributes and status)
GET/v2/service_instances/{instance_id}/last_operation—get the last requested operation state of a service instance (and last operation pereformed, /logs of the services)

API calls for common orchestrator services:
GET/v2/ext/service_instances/{instance_id}—invoke the GET method on the specified service instance
PUT/v2/ext/service_instances/{instance_id}—invoke the PUT method on the specified service instance
DELETE/v2/ext/service_instances/{instance_id}—invoke the DELETE method on the specified service instance
POST/v2/ext/service_instances/{instance_id}—invoke the POST method on the specified service instance A common orchestrator service interface can define create, read, update, and delete (CRUD) methods on a product orchestration engine. A service operation can be defined in a method payload. Operations can be common among product orchestration engines, such as operations for get_configuration, get_state, start, stop, get_capacity, get_remaining_capacity, add_capacity, and reduce_capacity.

A product orchestration engine can implement a get catalog API to provide its product orchestration service description document. An orchestration service can use a service description document to validate service dependencies and resource requirements. The orchestration service can also permit a product orchestration engine access to other product orchestration engine services.

A service mesh can be created to share services among product orchestrator engines. A product orchestration engine can access a service of another product orchestration engine from an orchestration service broker. A product orchestration engine can invoke a common orchestrator service API that is hosted by an orchestration service broker by specifying a depending product orchestration engine via tags—e.g., tags for category, name, and/or versions.

Through these approaches, complex multiple product end-to-end orchestration flows can be automated. This can lead to simplicity, efficiency, cost savings, and reduced burden on users.

Example Architectures

FIG. 1 illustrates an example system architecture 100 that can facilitate orchestrating and automating product deployment flow and lifecycle management, in accordance with an embodiment of this disclosure. System architecture 100 comprises computer system 102. In turn, computer system 102 comprises orchestrating and automating product deployment flow and lifecycle management component 104, application 106, product service design document 108, and product orchestration engines 110.

Figure 11:
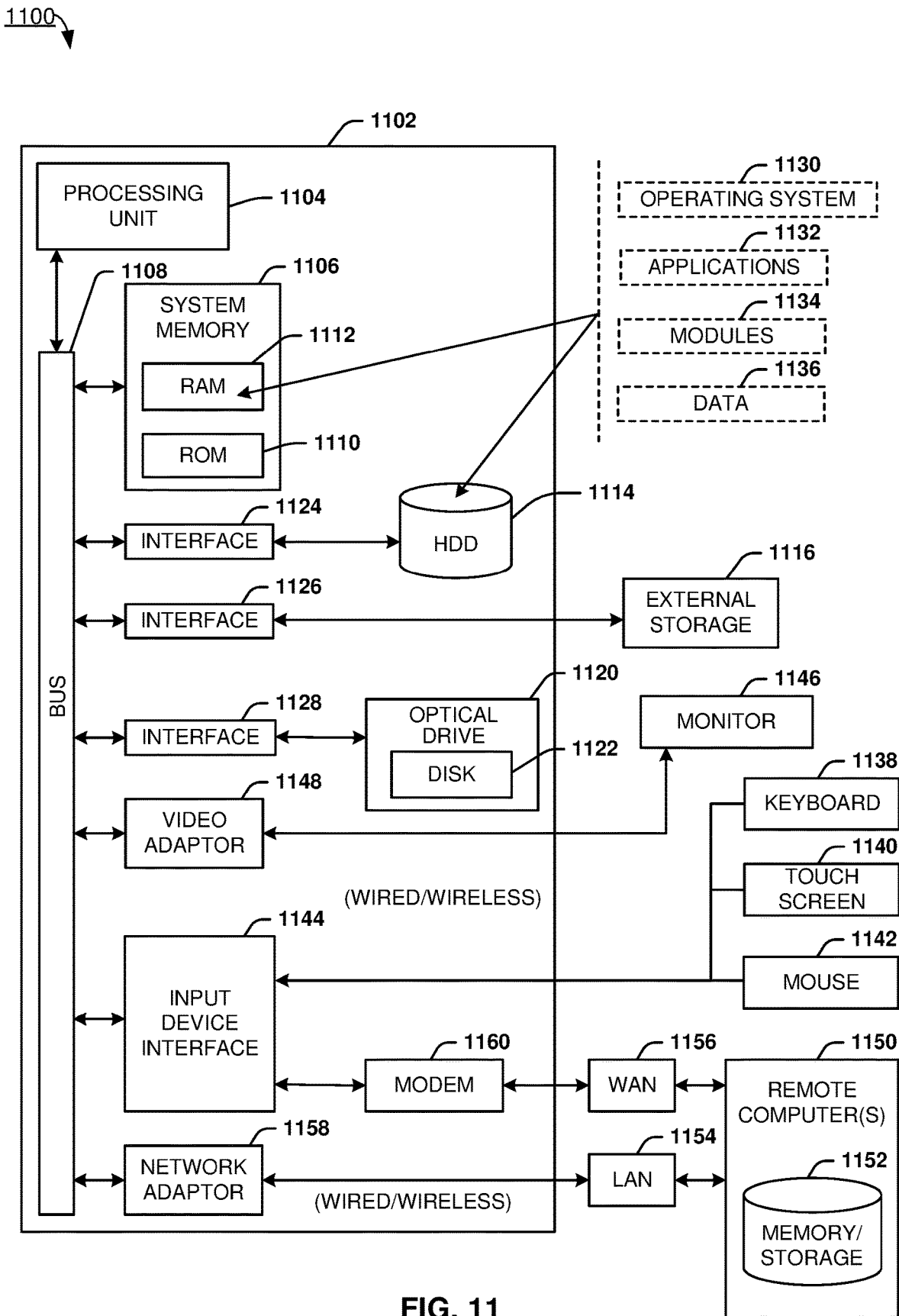
FIG. 11 illustrates an example block diagram of a computer operable to execute an embodiment of this disclosure.

In some examples, computer system 102 can be implemented with one or more instances of computer 1102 of FIG. 11.

Orchestrating and automating product deployment flow and lifecycle management component 104 can comprise a component that product service design document 108 and product orchestration engines 110 to install application 106. Product service design document 108 can be similar to service description document 402 of FIG. 4.

Figure 5:
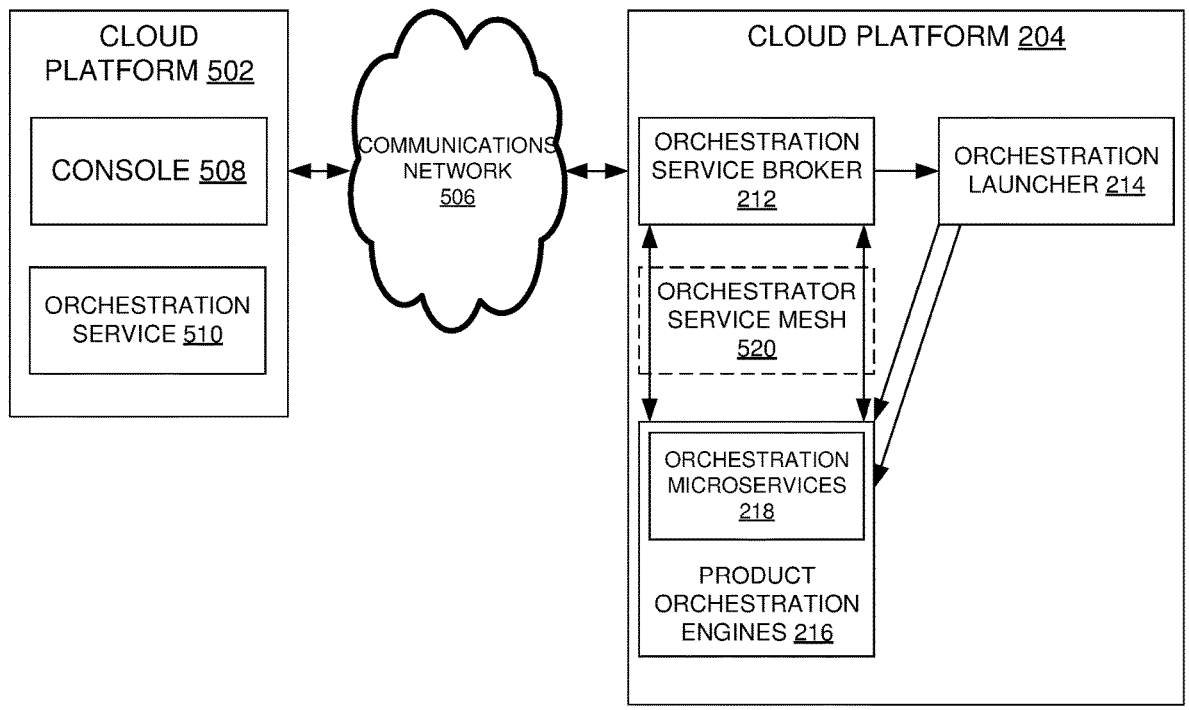
FIG. 5 illustrates an example system architecture for an orchestrator service mesh that can facilitate orchestrating and automating product deployment flow and lifecycle management, in accordance with an embodiment of this disclosure.
Figure 6:
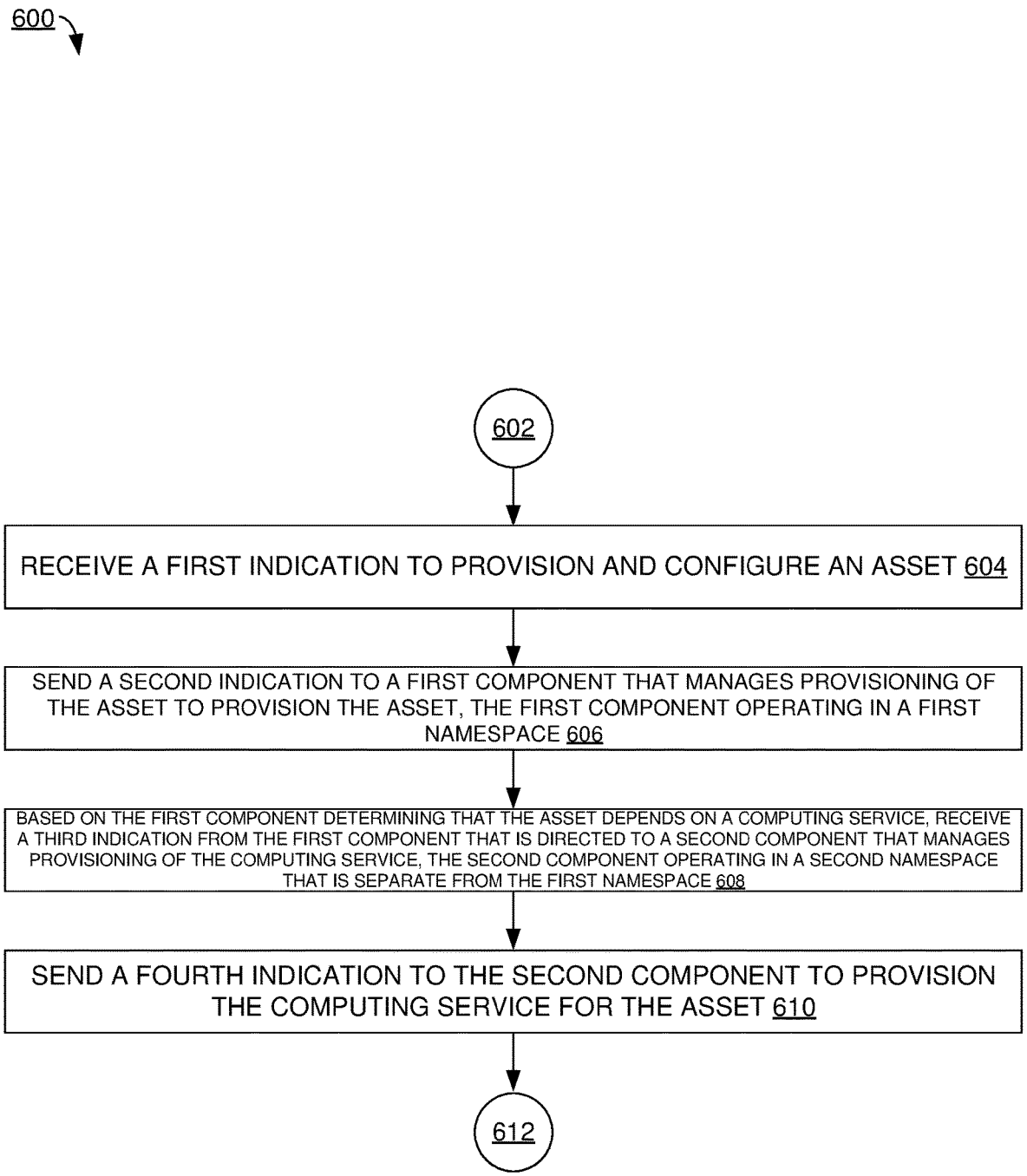
FIG. 6 illustrates an example process flow for orchestrating and automating product deployment flow and lifecycle management, in accordance with an embodiment of this disclosure.
Figure 7:
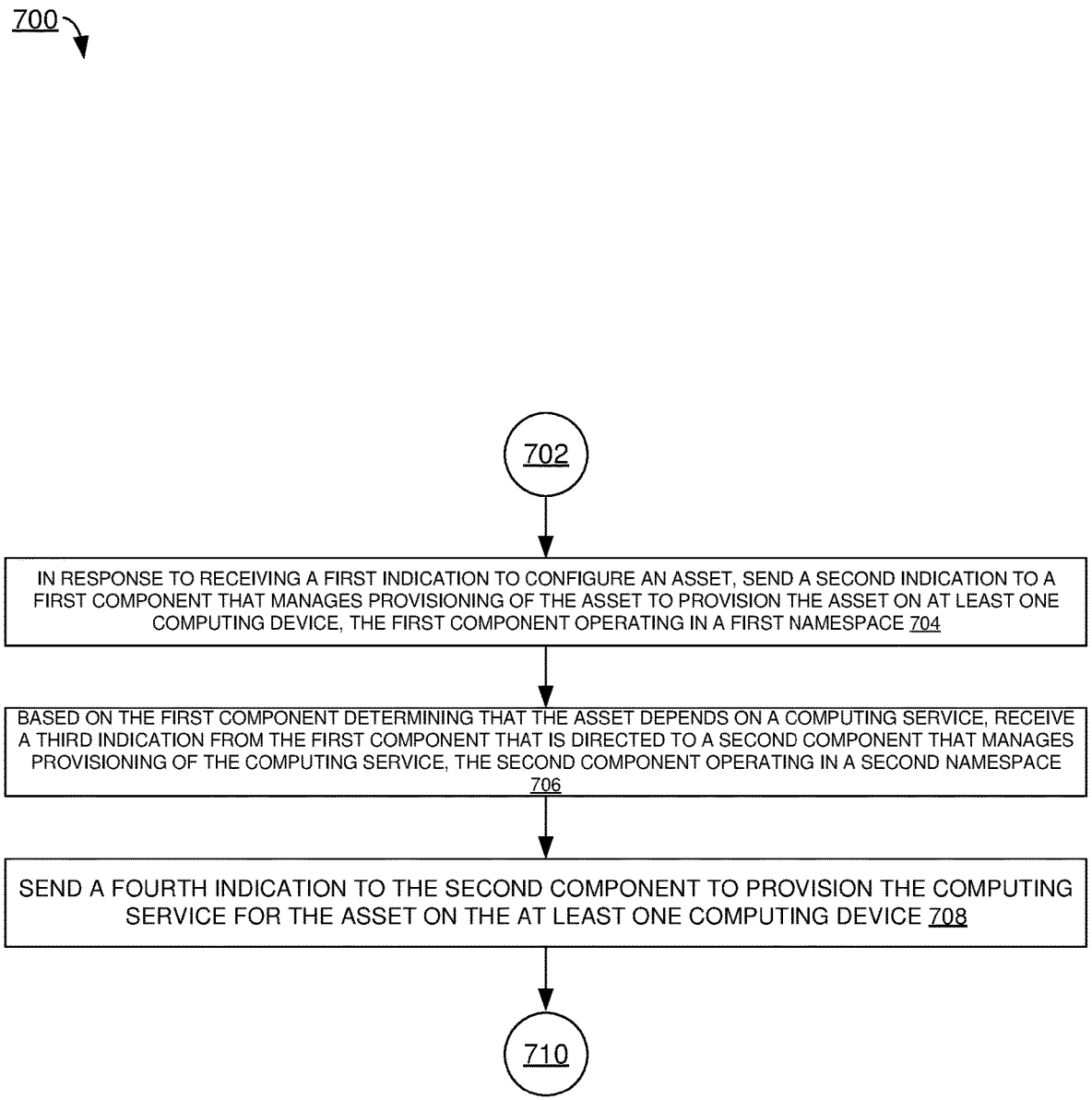
FIG. 7 illustrates another example process flow for orchestrating and automating product deployment flow and lifecycle management, in accordance with an embodiment of this disclosure.
Figure 9:
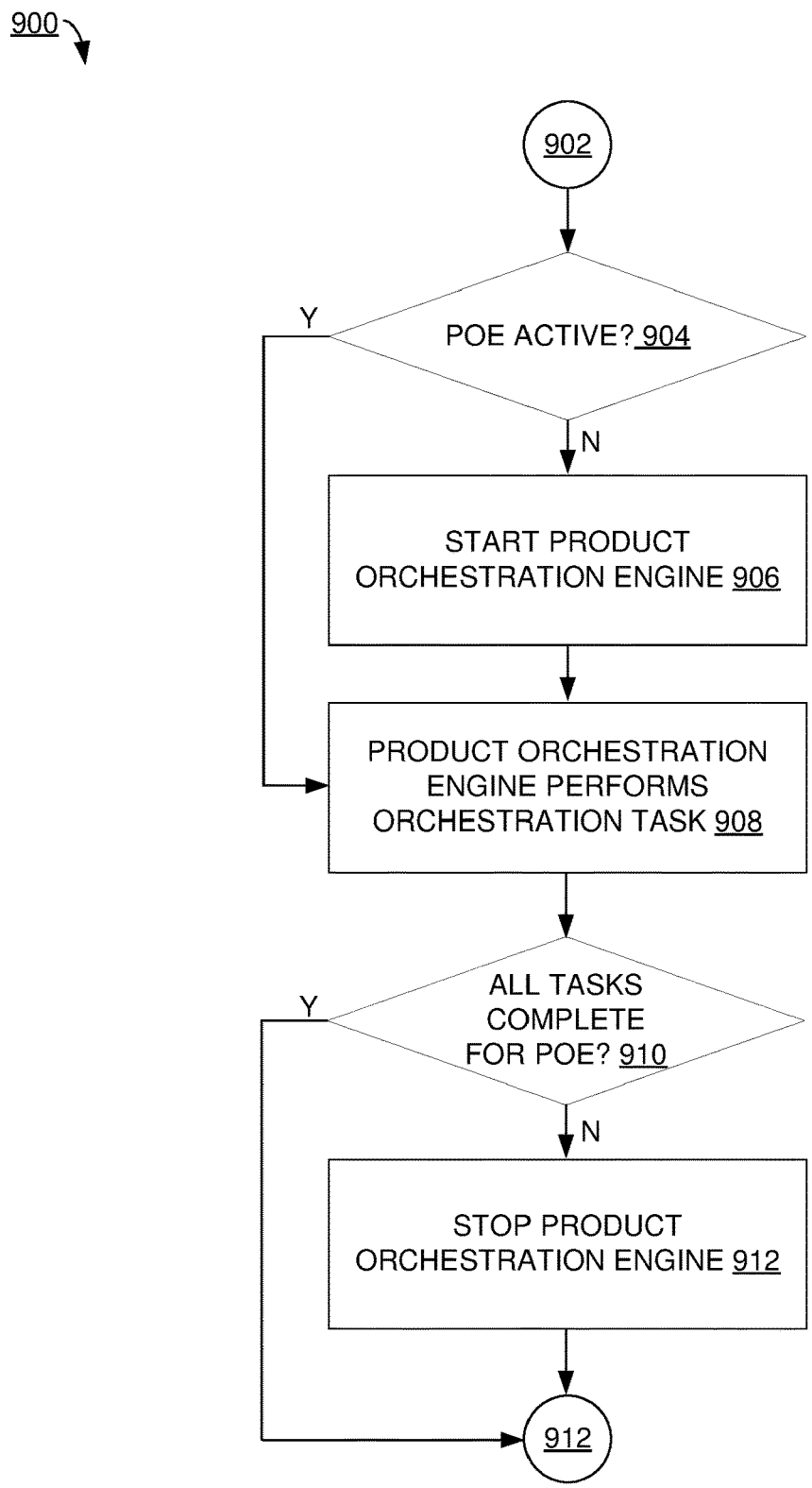
FIG. 9 illustrates a process flow for stopping and starting product orchestration engines to facilitate orchestrating and automating product deployment flow and lifecycle management, in accordance with an embodiment of this disclosure.
Figure 10:
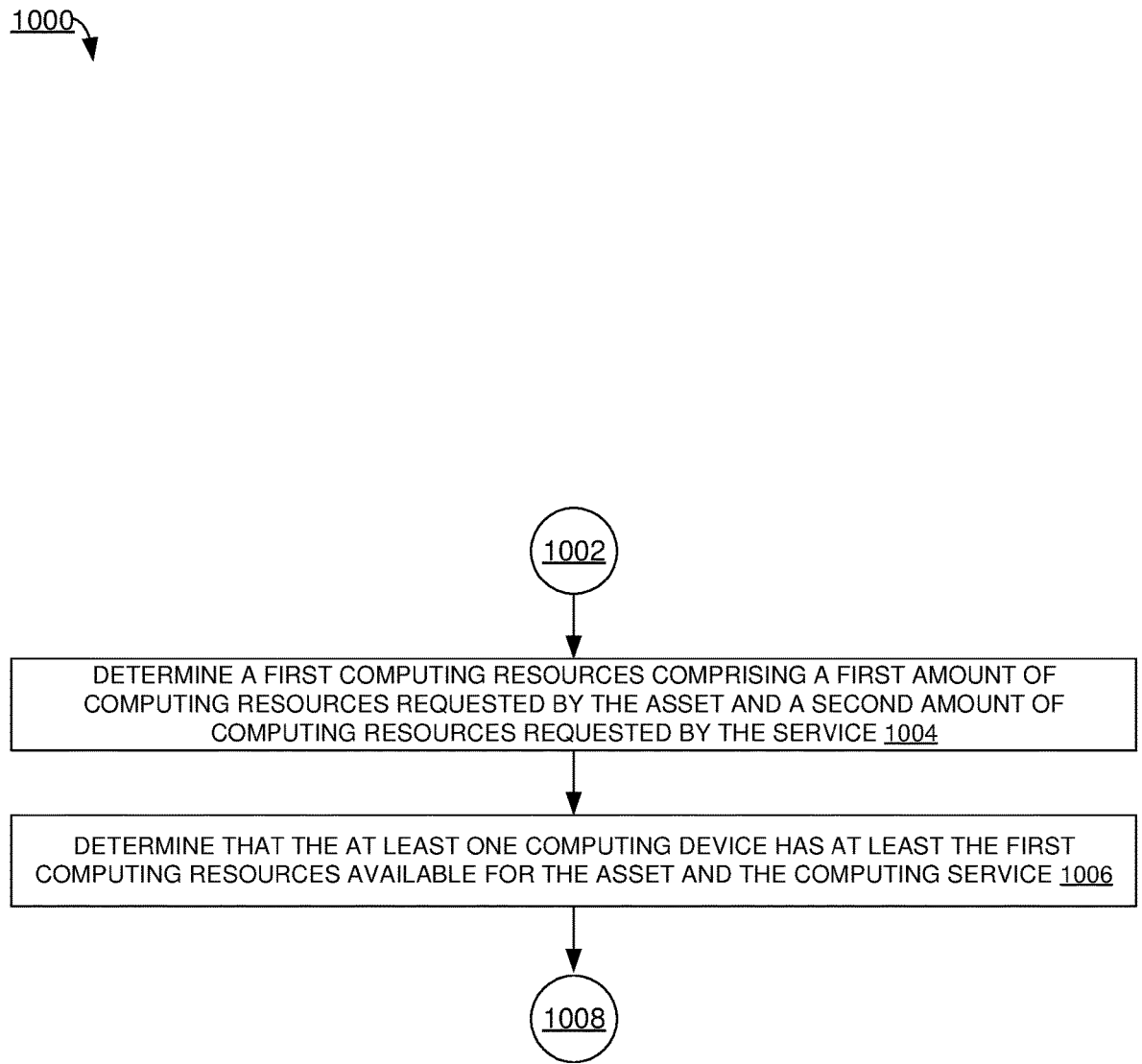
FIG. 10 illustrates an example process flow for processing multiple levels of dependencies to facilitate orchestrating and automating product deployment flow and lifecycle management, in accordance with an embodiment of this disclosure.

In the course of implementing orchestrating and automating product deployment flow and lifecycle management, orchestrating and automating product deployment flow and lifecycle management component 104 can implement part(s) of process flow 600 of FIG. 6, process flow 700 of FIG. 7, process flow 800 of FIG. 8, process flow 900 of FIG. 9, and/or process flow 1000 of FIG. 10. Additionally, in the course of implementing creating product orchestration engines, orchestrating and automating product deployment flow and lifecycle management component 104 can implement part(s) of system architecture 200 of FIG. 2, system architecture 300 of FIG. 3, system architecture 400 of FIG. 4, and/or system architecture 500 of FIG. 5.

Figure 2:
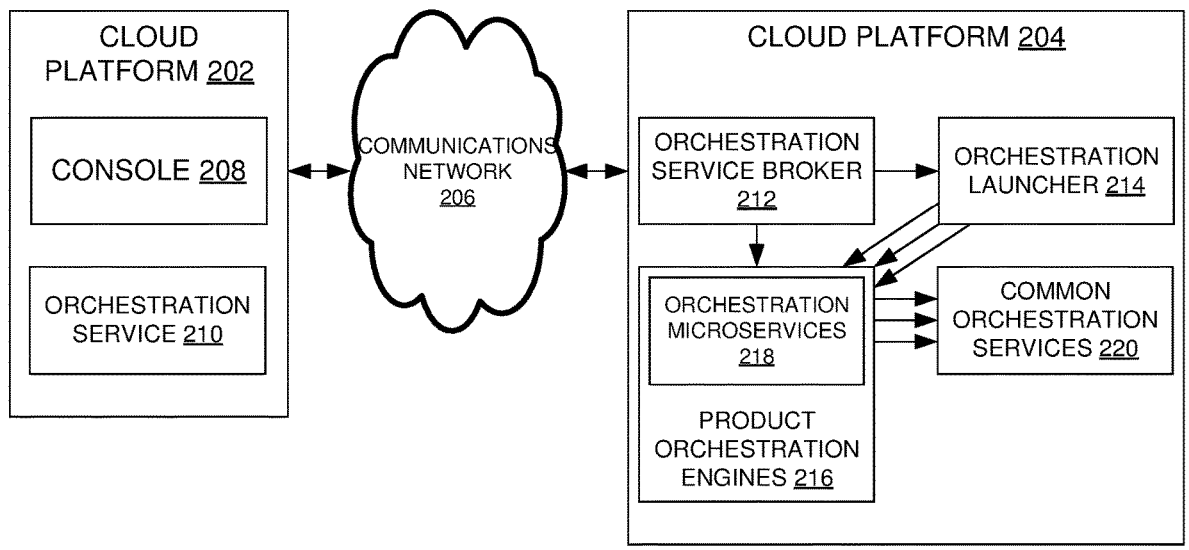
FIG. 2 illustrates another example system architecture that can facilitate orchestrating and automating product deployment flow and lifecycle management, in accordance with an embodiment of this disclosure.

FIG. 2 illustrates another example system architecture that can facilitate orchestrating and automating product deployment flow and lifecycle management, in accordance with an embodiment of this disclosure. In some examples, part(s) of system architecture 200 can be used to implement orchestrating and automating product deployment flow and lifecycle management component 104 of FIG. 1.

Parts of a system according to the present techniques can run on a cloud services platform (e.g., cloud platform 202) as well as on a user's on premises data center (e.g., on-premises platform 204). A user can order products and services and authorize product and service deployment orchestration. An orchestration service (e.g., orchestration service 210) can send orchestration commands to an orchestration service broker (e.g., orchestration service broker 212) that can run at a user site. An orchestration service broker can provide a set of common orchestrator services (e.g., common orchestration services 220) to product orchestration engines (e.g., product orchestration engines 216).

System architecture comprises cloud platform 202, on-premises platform 204, and communications network 206. Each of cloud platform 202 and on-premises platform 204 can comprise one or more computers that are similar to computing environment 1102 of FIG. 11. Communications network 206 can comprise a computer communications network, such as the Internet, or an isolated private computer communications network, which can be used for computer communications between cloud platform 202 and on-premises platform 204.

Cloud platform 202 comprises console 208 and orchestration service 210. Console 208 can receive data from a user about installing an application on on-premises platform 204. Console 208 can relay this information to orchestration service 210, which can communicate with orchestration service broker 212 of on-premises platform (and via communications network 206) to install the application.

On-premises platform 204 comprises orchestration service broker 212, orchestration launcher 214, product orchestration engines 216, orchestration microservices 218, and common orchestration services 220. Each product orchestration engine of product orchestration engines 216 can host an orchestration microservice of orchestration microservices 218. An orchestration microservice of orchestration microservices 218 can interface with both orchestration service broker 212 and orchestration launcher 214 to process commands.

Figure 3:
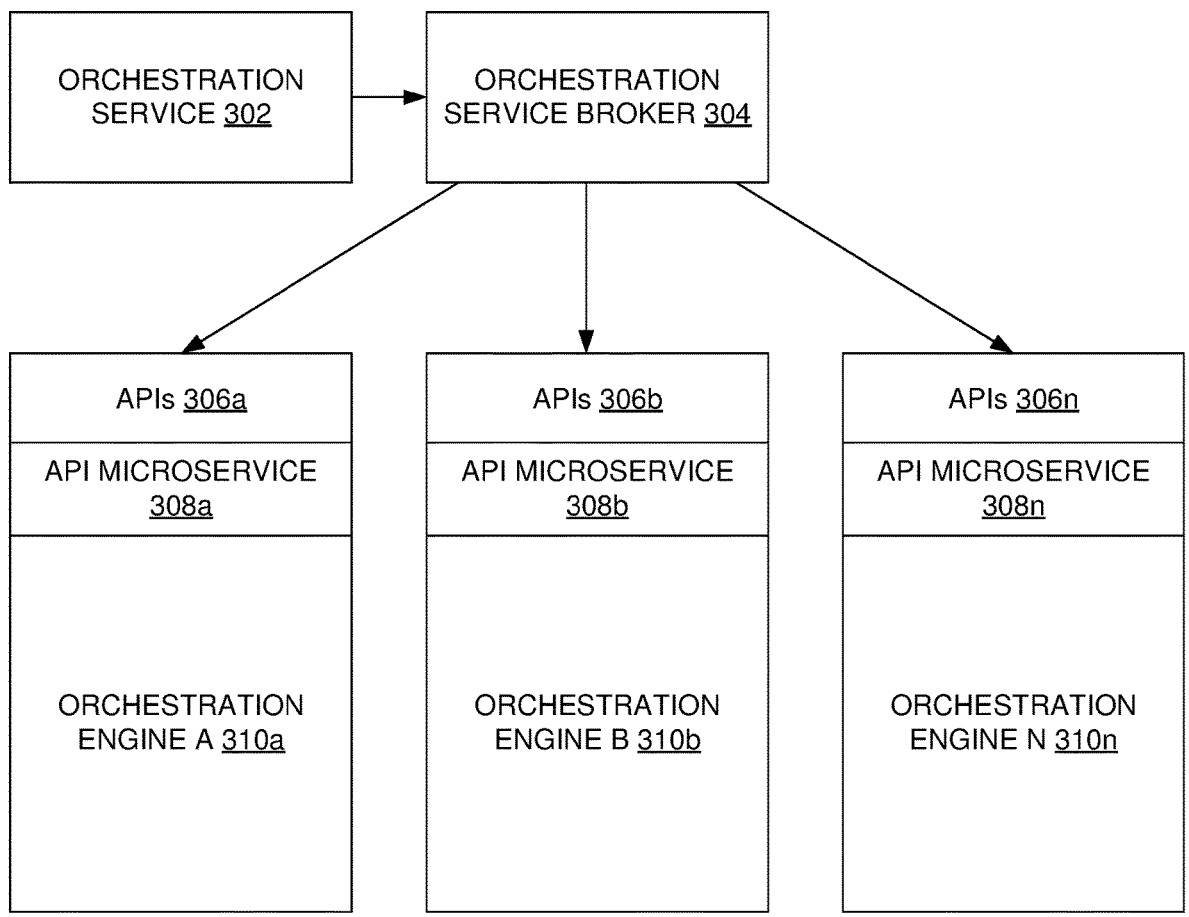
FIG. 3 illustrates another example system architecture that can facilitate orchestrating and automating product deployment flow and lifecycle management, in accordance with an embodiment of this disclosure.

FIG. 3 illustrates another example system architecture 300 that can facilitate orchestrating and automating product deployment flow and lifecycle management, in accordance with an embodiment of this disclosure. In some examples, part(s) of system architecture 300 can be used to implement orchestrating and automating product deployment flow and lifecycle management component 104 of FIG. 1.

System architecture 300 comprises orchestration service 302, orchestration service broker 304, APIs 306a, API microservice 308a, orchestration engine A 310a, APIs 306b, API microservice 308b, orchestration engine B 310b, APIs 306n, API microservice 308n, and orchestration engine N 310n.

Orchestration service 302 can create product orchestration engines, such as orchestration engine A 310a and orchestration engine B 310b. Orchestration service 302 can also use these product orchestration engines in concert to orchestrate applications. In some examples, each product orchestration engine is configured to orchestrate a single and distinct part, such as network or compute. Where an application uses both network and compute, then orchestration service 302 can invoke separate product orchestration engines for network and compute, respectively, to effectuate orchestrating this application.

To communicate with product orchestration engines, orchestration service 302 can utilize an API such as an API provided by orchestration service broker 304. In some examples, orchestration service 302 can operate on a cloud computing platform, while orchestration service broker 304 operates on a user's on premises computer system.

Each product orchestration engine can implement APIs (e.g., APIs 306a, APIs 306b, and APIs 306n). These APIs can be invoked by orchestration service 302, and when invoked, cause the respective product orchestration engine to invoke one or more scripts used in provisioning and lifecycle management of a product orchestration engine. Each product orchestration engine can also implement a microservice (e.g., API microservice 308a, API microservice 308b, and API microservice 308n) that receives and processes API calls of the APIs.

Each product orchestration engine can also comprise the orchestration engine itself (e.g., orchestration engine A 310a, orchestration engine B 310b, and orchestration engine N 310n).

FIG. 4 illustrates an example system architecture 400 for a service description document that can facilitate orchestrating and automating product deployment flow and lifecycle management, in accordance with an embodiment of this disclosure. In some examples, part(s) of system architecture 400 can be used to implement orchestrating and automating product deployment flow and lifecycle management component 104 of FIG. 1.

System architecture 400 comprises service description document 402. In turn, service description document 402 comprises information for one example service, service 404. Information for service 404 in service description document 402 is name 406 (indicating a name of the service), id 408 (indicating a unique identifier for the service, in a case where two names of services might be the same, such as with different versions of one product), description 410 (which can comprise a text description of the service offered), tags 412, plan updateable 416 (which can be a boolean—TRUE or FALSE—that indicates whether a user plan can be updated in using the service), plans 418 (indicating which types of user plans are supported for this service), requirements 420, and dependencies 422.

Tags 412 can provide for unique identification of a service via a search query. As depicted, tags 412 has three tags, which each capture a different type of information. Tag 414-0 uses a name as a tag, tag 414-1 uses a category as a tag, and tag 414-2 uses a version as a tag.

Requirements 420 specifies resources needed based on a user's plan selection and ordered quantities. Dependencies 422 specifies orchestrator services that are provided by specified product orchestration engine(s).

A developer of a product orchestration engine can provide the information in service description document 402 to facilitate building product orchestration engines in the course of orchestrating and automating product deployment flow and lifecycle management.

FIG. 5 illustrates an example system architecture 500 for an orchestrator service mesh that can facilitate orchestrating and automating product deployment flow and lifecycle management, in accordance with an embodiment of this disclosure. In some examples, part(s) of system architecture 500 can be used to implement orchestrating and automating product deployment flow and lifecycle management component 104 of FIG. 1.

A service mesh (e.g., service mesh 520) can be created to share services among product orchestrator engines. A product orchestration engine (e.g., a product orchestration engine of product orchestration engines 516) can access a service of another product orchestration engine (e.g., another product orchestration engine of product orchestration engines 516) from an orchestration service broker (e.g., orchestration service broker 512). A product orchestration engine can invoke a common orchestrator service API that is hosted by an orchestration service broker by specifying a depending product orchestration engine via tags—e.g., tags for category, name, and/or versions. An orchestration service broker can identify the specified product orchestration engine, determine whether the product orchestration engine is running, load and start the product orchestration engine if it was not running, invoke a corresponding common orchestrator service operation on the specified product orchestration engine, and then stop the specified product orchestration engine if all tasks are completed.

An orchestration service mesh can help grow a healthy ecosystem of common orchestration services. Each product orchestration engine can both contribute to a product provision and lifecycle automation, as well as contribute to enabling other product orchestration engines.

In approaches according to the present techniques, an orchestration service broker can function as a proxy of an orchestration service mesh. This approach can create an isolation among product orchestration engines.

System architecture comprises cloud platform 502 (which can be similar to cloud platform 202 of FIG. 2), on-premises platform 504 (which can be similar to on-premises platform 204), and communications network 506 (which can be similar to communications network 206).

Cloud platform 502 comprises console 508 (which can be similar to console 208) and orchestration service 510 (which can be similar to orchestration service 210).

On-premises platform 504 comprises orchestration service broker 512 (which can be similar to orchestration service broker 212), orchestration launcher 514 (which can be similar to orchestration launcher 214), product orchestration engines 516 (which can be similar to product orchestration engines 216), orchestration microservices 518 (which can be similar to orchestration microservices 218), and orchestration service mesh 520.

In an architecture that utilizes orchestration service mesh 520, orchestration service broker 512 can serve as a proxy for operations between product orchestration engines 516 in the mesh. This architecture can create isolation between the product orchestration engines of product orchestration engines 516. In other examples, a service mesh architecture can be created to provide for direct connections of product orchestration engines of product orchestration engines 516.

Example Process Flows

FIG. 6 illustrates an example process flow 600 for orchestrating and automating product deployment flow and lifecycle management, in accordance with an embodiment of this disclosure. In some examples, one or more embodiments of process flow 600 can be implemented by orchestrating and automating product deployment flow and lifecycle management component 104 of FIG. 1, or computing environment 1102 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 600 of FIG. 7, process flow 800 of FIG. 8, process flow 900 of FIG. 9, and/or process flow 1000 of FIG. 10.

Process flow 600 begins with 602, and moves to operation 604. Operation 604 depicts receiving a first indication to provision and configure an asset. In some examples, an asset can be an application to be executed by a computer system. This can comprise receiving user input indicative of desiring to install an application that corresponds to the asset.

In some examples, the first indication to provision and configure the asset is received from a first computer, and operation 604 comprises, before receiving the first indication, receiving information about the asset from a second computer that indicates resource requirements of the asset and that indicates a dependency of the asset on the computing service. That is, a product orchestrator description document can be received by an orchestration service broker to use to create a product orchestrator engine.

In some examples, an asset can be an application to be installed. In some examples, provisioning an asset can include providing life cycle management for the asset while the asset operates.

In some examples, the resource requirements indicate resource requirements for customer plans or licenses, the indication to provision and configure the asset being associated with a first customer plan or license of the customer plans of licenses. In some examples, the resource requirements indicate resource requirements for licenses, the indication to provision and configure the asset being associated with a first license of the licenses.

In some examples, the first indication to provision and configure the asset is received from a first computer, and operation 604 comprises before receiving the first indication, receiving information about the first component from a second computer that indicates operations of the first component that can be invoked. That is, a service instance interface can be defined for a product orchestration engine that specifies API calls that can be made to invoke operations by the product orchestration engine.

After operation 604, process flow 600 moves to operation 606.

Operation 606 depicts sending a second indication to a first component that manages provisioning of the asset to provision the asset, the first component operating in a first namespace. This can comprise an orchestration service broker sending a message to a component (which can be a product orchestration engine) to provision the asset.

After operation 606, process flow 600 moves to operation 608.

Operation 608 depicts, based on the first component determining that the asset depends on a computing service, receiving a third indication from the first component that is directed to a second component that manages provisioning of the computing service, the second component operating in a second namespace that is separate from the first namespace. This can comprise the product orchestration engine determining from information that it stores in its first namespace that the service it provisions depends on another service that is provisioned by another product orchestration engine. The product orchestration engine can send a message indicating this to the orchestration service broker.

In some examples, the first component determines that the asset depends on a computing service based on stored data about the asset that identifies a category of the computing service. In some examples, the first component determines that the asset depends on a computing service based on stored data about the asset that identifies a version of the computing service. That is, a product orchestration engine can be specified via tags, such as tags for category, version, or name.

After operation 608, process flow 600 moves to operation 610.

Operation 610 depicts sending a fourth indication to the second component to provision the computing service for the asset. This can comprise the orchestration service broker, based on receiving a message from the product orchestration engine, sending a message to another product orchestration engine to provision a service that it provisions. In this manner, a system architecture of an orchestration service broker and multiple product orchestration engines can provide a mesh architecture, with wiring for the product orchestration engines to work in concert where messages are transmitted through the orchestration service broker.

In some examples, operation 610 can comprise, based on the asset depending on the computing service, provisioning the computing service before provisioning the asset. That is, in some examples, there can be a specific order of operations to provisioning assets and resources (e.g., a compute resource can be provisioned before a cloud resource, which can be provisioned before the application/asset), and this order can be followed in provisioning dependencies.

In some examples, operation 610 comprises, before sending the fourth indication to the second component to provision the computing service for the asset, determining that the second component is not running, starting the second component. That is, an orchestration service broker can start and stop a product orchestration engine. Where the orchestration service broker wishes to invoke the product orchestration engine to provision an asset, and the product orchestration engine is stopped at the time, the orchestration service broker can start the product orchestration engine.

In some examples, operation 610 comprises, after the second component has provisioned the computing service, stopping the second component. Similarly to the orchestration service broker starting the product orchestration engine, the orchestration service broker can stop the product orchestration engine after the product orchestration engine completes provisioning its asset. In some examples, this includes performing the stopping of the second component in response to determining that the second component has no active provisioning task. That is, a product orchestration engine can be stopped where it has no active provisioning tasks.

After operation 610, process flow 600 moves to 612, where process flow 600 ends.

FIG. 7 illustrates an example process flow 700 for orchestrating and automating product deployment flow and lifecycle management, in accordance with an embodiment of this disclosure. In some examples, one or more embodiments of process flow 700 can be implemented by orchestrating and automating product deployment flow and lifecycle management component 104 of FIG. 1, or computing environment 1102 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, and/or process flow 1000 of FIG. 10.

Process flow 700 begins with 702, and moves to operation 704. Operation 704 depicts, in response to receiving a first indication to configure an asset, sending, a second indication to a first component that manages provisioning of the asset to provision the asset on at least one computing device, the first component operating in a first namespace. In some examples, operation 704 can be implemented in a similar manner as operations 604 and 606 of FIG. 6.

After operation 704, process flow 700 moves to operation 706.

Operation 706 depicts, based on the first component determining that the asset depends on a computing service, receiving a third indication from the first component that is directed to a second component that manages provisioning of the computing service, the second component operating in a second namespace. In some examples, operation 706 can be implemented in a similar manner as operation 608 of FIG. 6.

In some examples, operation 706 comprises determining first computing resources comprising a first amount of computing resources requested by the asset and a second amount of computing resources requested by the service, and determining that the at least one computing device has at least the first computing resources available for the asset and the computing service. That is, each component (e.g., a product orchestration engine) can define resource requirements for the service or asset it instantiates, and it can be determined that there are enough available resources for all of the services in the dependency chain.

In some examples, operation 708 comprises determining that the first computing service depends on a second computing service that is provisioned by a third component, and sending a fifth indication to the third component to provision the second computing service. In some examples, the stored data comprises first stored data, and operation 708 comprises determining that the first computing service depends on the second computing service based on the second computing service accessing stored data in the second namespace. That is, there can be multiple levels of dependencies. In some examples, each component can store information about its own direct dependencies, and not store information about subsequent dependencies of those dependencies. Then, those respective dependencies can store information about their own direct dependencies.

In some examples, the at least one computing device comprises a computing container that comprises a runtime in which the asset and the computing service execute, and wherein the computing container omits an operating system.

In some examples, operation 706 comprises selecting the at least one computing device based on the computing service being determined to offer a combined level of performance requested by the asset and the computing service. That is, services can have performance requirements (e.g., process X commands per second) in addition to resource requirements (e.g., an amount of storage).

After operation 706, process flow 700 moves to operation 708.

Operation 708 depicts sending a fourth indication to the second component to provision the computing service for the asset on the at least one computing device. In some examples, operation 708 can be implemented in a similar manner as operation 610 of FIG. 6.

After operation 708, process flow 700 moves to 710, where process flow 700 ends.

FIG. 8 illustrates another example process flow 800 for orchestrating and automating product deployment flow and lifecycle management, in accordance with an embodiment of this disclosure. In some examples, one or more embodiments of process flow 800 can be implemented by orchestrating and automating product deployment flow and lifecycle management component 104 of FIG. 1, or computing environment 1102 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, and/or process flow 1000 of FIG. 10.

Process flow 800 begins with 802, and moves to operation 804. Operation 804 depicts, in response to receiving a first indication to configure an asset, sending a second indication to a first component that manages provisioning of the asset to provision the asset on at least one computing device, the first component operating in a first namespace. In some examples, operation 804 can be implemented in a similar manner as operations 604 and 606 of FIG. 6.

After operation 804, process flow 800 moves to operation 806.

Operation 806 depicts, based on the first component determining that the asset depends on a service based on information stored by the first component in the first namespace, receiving a third indication from the first component that is directed to a second component that manages provisioning of the service, the second component operating in a second namespace. In some examples, operation 806 can be implemented in a similar manner as operation 608 of FIG. 6.

In some examples, the information stored by the first component comprises an identifier of the second component, and operation 806 comprises utilizing the identifier of the second component to access the second component. In some examples, the second component maintains and accesses second information that identifies resource requirements of the service. That is, in some examples, the first component can store information that identifies the second component, and the second component can store the information about the resource requirements of the service it provisions.

In some examples, the service comprises a network service, a compute service, a storage service, or a hypervisor platform interface service.

After operation 806, process flow 800 moves to operation 808.

Operation 808 depicts sending a fourth indication to the second component to provision the service for the asset on the at least one computing device. In some examples, operation 808 can be implemented in a similar manner as operation 610 of FIG. 6.

After operation 808, process flow 800 moves to 810, where process flow 800 ends.

FIG. 9 illustrates a process flow 900 for stopping and starting product orchestration engines to facilitate orchestrating and automating product deployment flow and lifecycle management, in accordance with an embodiment of this disclosure. In some examples, one or more embodiments of process flow 900 can be implemented by orchestrating and automating product deployment flow and lifecycle management component 104 of FIG. 1, or computing environment 1102 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, process flow 800 of FIG. 8, and/or process flow 1000 of FIG. 10.

Process flow 900 begins with 902, and moves to operation 904. Operation 904 depicts determining whether the product orchestration engine is active. In some examples, this can comprise orchestrating and automating product deployment flow and lifecycle management component 104 of FIG. 1 determining whether a known process associated with the product orchestration engine is currently running. Where it is determined in operation 904 that the product orchestration engine is active, process flow 900 moves to operation 908. Instead, where it is determined in operation 904 that the product orchestration engine is inactive, process flow 900 moves to operation 906.

Operation 906 is reached from operation 904 where it is determined that the product orchestration engine is inactive. Operation 906 depicts starting the product orchestration engine. This can comprise orchestration service broker 212 of FIG. 2 instructing orchestration launcher 214 to launch the product orchestration engine. After operation 906, process flow 900 moves to operation 908.

Operation 908 is reached from operation 904 where it is determined that the product orchestration engine is active, or from operation 906. Operation 908 depicts performing an orchestration task with the product orchestration engine. This can comprise orchestration service broker 212 of FIG. 2 instructing a product orchestration engine of product orchestration engines 216 to perform a particular orchestration task (such as orchestrating compute resources for an application that's being installed). After operation 908, process flow 908 moves to operation 910.

Operation 910 depicts determining whether all tasks are complete for the product orchestration engine. This can comprise orchestration service broker 212 maintaining a list of tasks that have been assigned to a product orchestration engine, and marking them as completed upon receiving an indication from the product orchestration engine that it has completed a particular task. Where orchestration service broker 212 has indication of active tasks for a given product orchestration engine, it can be determined that all tasks are complete for the product orchestration engine.

Where it is determined in operation 908 that all tasks are complete for the product orchestration engine, process flow 900 moves to operation 910. Instead, where it is determined in operation 908 that not all tasks are complete for the product orchestration engine, process flow 900 moves to 912, where process flow 900 ends.

Operation 910 is reached from operation 908 where it is determined that all tasks are complete for the product orchestration engine. Operation 910 depicts stopping the product orchestration engine. This can comprise orchestration service broker 212 of FIG. 2 sending an indication to orchestration launcher 214 to stop the particular product orchestration engine, and orchestration launcher 214 stopping the product orchestration engine. After operation 910, process flow 900 moves to 912, where process flow 900 ends.

In this manner, operation 900 can be implemented to run product orchestration engines on demand. That is, a product orchestration engine can be started when it is to perform an orchestration task (and an instance of the product orchestration engine is not currently running). Then, when the product orchestration engine finishes the orchestration task, if it has no other active orchestration tasks, the product orchestration engine can be stopped.

FIG. 10 illustrates an example process flow 1000 for processing multiple levels of dependencies to facilitate orchestrating and automating product deployment flow and lifecycle management, in accordance with an embodiment of this disclosure. In some examples, one or more embodiments of process flow 1000 can be implemented by orchestrating and automating product deployment flow and lifecycle management component 104 of FIG. 1, or computing environment 1102 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 700 of FIG. 7, process flow 800 of FIG. 8, and/or process flow 900 of FIG. 9.

Process flow 1000 begins with 1002, and moves to operation 1004. Operation 1004 depicts determining a first computing resources comprising a first amount of computing resources requested by the asset and a second amount of computing resources requested by the service. Each product orchestration engine can store information about how much and what type of system resources it requests to provision one instance of its service. This can include different type of resources, such as computer processor resources and memory resources. An orchestration service broker can obtain this information from each respective product orchestration engine, and combine it to determine a cumulative amount of requested system resources.

After operation 1004, process flow 1000 moves to operation 1006.

Operation 1006 depicts determining that the at least one computing device has at least the first computing resources available for the asset and the computing service. As part of overseeing orchestration for an asset/application along with its corresponding dependencies, an orchestration service broker can determine that a computing device on which the application is provisioned has sufficient system resources available to meet the requests of the asset/application and its dependencies. After operation 1006, process flow 1000 moves to 1008, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of computer system 102 of FIG. 1.

In some examples, computing environment 1100 can implement one or more embodiments of the process flows of FIGS. 6-10 to facilitate orchestrating and automating product deployment flow and lifecycle management component.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   receiving a first indication to provision and configure an asset;
   sending a second indication to a first computer namespace within the system to provision the asset;
   based on determining in the first namespace that the asset depends on a computing service, receiving a third indication from the first namespace that is directed to a second computer namespace within the system, wherein the second computer namespace is separate from the first computer namespace; and
   sending a fourth indication to the second computer namespace to provision the computing service for the asset, wherein based on the asset depending on the computing service, provisioning the computing service is performed before provisioning the asset.

2. The system of claim 1, wherein the first indication to provision and configure the asset is received from a first computer, and wherein the operations further comprise:
   before receiving the first indication, receiving information about the asset from a second computer that indicates resource requirements of the asset and that indicates a dependency of the asset on the computing service.

3. The system of claim 2, wherein the resource requirements indicate resource requirements for customer plans or licenses, the indication to provision and configure the asset being associated with a first customer plan or license of the customer plans of licenses.

4. The system of claim 1, wherein the first indication to provision and configure the asset is received from a first computer, and wherein the operations further comprise:
before receiving the first indication, receiving information about the first computer namespace from a second computer that indicates operations of the first computer namespace that are able to be invoked.

5. The system of claim 1, wherein the first computer namespace determines that the asset depends on the computing service based on stored data about the asset that identifies a category of the computing service.

6. The system of claim 1, wherein the first computer namespace determines that the asset depends on the computing service based on stored data about the asset that identifies a version of the computing service.

7. The system of claim 1, wherein the operations further comprise:
before sending the fourth indication to the second computer namespace to provision the computing service for the asset, determining that a computer process of the second computer namespace is not running; and
starting the computer process.

8. The system of claim 7, wherein the operations further comprise:
after the computer process has provisioned the computing service, stopping the computer process.

9. The system of claim 8, wherein the operations further comprise:
performing the stopping of the computer process in response to determining that the computer process has no active provisioning task.

10. A method, comprising:
in response to receiving a first indication to configure an asset, sending, by a system comprising a processor, a second indication to a first computer namespace of the system that is configured to provision the asset to provision the asset on at least one computing device;
based on the first computer namespace determining that the asset depends on a computing service, receiving, by the system, a third indication from the first computer namespace that is directed to a second computer namespace that manages provisioning of the computing service; and
sending, by the system, a fourth indication to the second computer namespace to provision the computing service for the asset on the at least one computing device, wherein based on the asset depending on the computing service, provisioning the computing service is performed before configuring the asset.

11. The method of claim 10, further comprising:
determining, by the system, a first computing resources comprising a first amount of computing resources requested by the asset and a second amount of computing resources requested by the service; and
determining, by the system, that the at least one computing device has at least the first computing resources available for the asset and the computing service.

12. The method of claim 10, wherein the computing service is a first computing service, and further comprising:
determining, by the system, that the first computing service depends on a second computing service that is provisioned by a third computing service; and
sending, by the system, a fifth indication to the third computing service to provision the second computing service.

13. The method of claim 12, wherein the stored data comprises first stored data, and further comprising:
determining, by the system, that the first computing service depends on the second computing service based on the second computing service accessing stored data in the second computer namespace.

14. The method of claim 10, wherein the at least one computing device comprises a computing container that comprises a runtime in which the asset and the computing service execute, and wherein the computing container omits an operating system.

15. The method of claim 10, further comprising:
selecting, by the system, the at least one computing device based on the computing service being determined to offer a combined level of performance requested by the asset and the computing service.

16. A non-transitory computer-readable medium comprising instructions that, in response to execution, cause a system comprising a processor to perform operations, comprising:
in response to receiving a first indication to configure an asset, sending a second indication to a first namespace of the system that is configured to provision the asset to provision the asset on at least one computing device;
based determining in the first namespace that the asset depends on a service based on information stored in the first namespace, receiving a third indication from the first namespace that is directed to a second namespace of the system that is configured to provision the service; and
sending a fourth indication to the second namespace to provision the service for the asset on the at least one computing device, wherein based on the asset depending on the service, provisioning the service is performed before configuring the asset.

17. The non-transitory computer-readable medium of claim 16, wherein the information stored in the first namespace comprises an identifier of the second namespace, and wherein the operations further comprise:
utilizing the identifier of the second namespace to access the second namespace.

18. The non-transitory computer-readable medium of claim 17, wherein the information is first information, and wherein the second namespace is configured to maintain and access second information that identifies resource requirements of the service.

19. The non-transitory computer-readable medium of claim 16, wherein the service comprises a network service, a compute service, a storage service, or a hypervisor platform interface service.

20. The non-transitory computer-readable medium of claim 16, wherein the first namespace is configured to determine that the asset depends on the service based on stored data about the asset that identifies a category of the service.

* * * * *